US005957994A

United States Patent [19]

Meyer et al.

[11] Patent Number: 5,957,994

[45] Date of Patent: Sep. 28, 1999

[54] METHOD FOR IMPROVING SPARK IGNITED INTERNAL COMBUSTION ENGINE ACCELERATION AND IDLING IN THE PRESENCE OF POOR DRIVEABILITY FUELS

[75] Inventors: Daniel Lawrence Meyer, Dearborn; Philip William Husak, Southgate; Michael John Cullen, Northville; Steven Ray Whittier, Saline; Julia Marie Giuliano, Canton; Anupam Narula, Ann Arbor, all of Mich.

[73] Assignee: Ford Global Technologies, Inc., Dearborn, Mich.

[21] Appl. No.: 08/689,570

[22] Filed: Aug. 12, 1996

[51] Int. Cl.[6] .................... G01M 15/00

[52] U.S. Cl. .................... 701/110; 73/116; 73/117.3; 123/339; 123/419; 123/436; 701/104

[58] Field of Search .................... 73/116, 117.2, 73/117.3, 118.1; 123/419, 425, 436, 339; 701/110, 111, 103, 104, 105

[56] References Cited

U.S. PATENT DOCUMENTS

| | | | |
|---|---|---|---|
| 4,760,830 | 8/1988 | Bullis et al. | 73/117.3 |
| 4,780,827 | 10/1988 | Fujimori et al. | 701/110 |
| 4,877,101 | 10/1989 | Tada et al. | 701/110 |
| 4,957,083 | 9/1990 | Nakaniwa et al. | 123/436 |
| 5,012,422 | 4/1991 | Takahashi et al. | 701/103 |
| 5,035,226 | 7/1991 | Nishikawa et al. | 73/117.3 |
| 5,069,183 | 12/1991 | Nagano et al. | 73/117.3 |
| 5,150,301 | 9/1992 | Kashiwabara et al. | 701/103 |
| 5,229,946 | 7/1993 | Ghaem | 701/103 |
| 5,247,445 | 9/1993 | Miyano et al. | 701/115 |
| 5,267,163 | 11/1993 | Yoshida et al. | 701/103 |
| 5,307,276 | 4/1994 | Takahashi et al. | 701/103 |
| 5,614,666 | 3/1997 | Hara et al. | 73/117.3 |
| 5,690,072 | 11/1997 | Meyer et al. | 73/117.3 |

*Primary Examiner*—George M. Dombroske
*Attorney, Agent, or Firm*—Allan J. Lippa, Esq.; Roger L. May, Esq.

[57] ABSTRACT

A method for accelerating the rotational speed of a crankshaft of an internal combustion engine having a plurality of cylinders each having a spark plug wherein a predetermined amount of delivered fuel is to be combusted at a firing time within each of the plurality of cylinders with each rotation of the camshaft or crankshaft based on an acceleration input made by an operator includes the step of receiving the accelerating input, measuring the rotational speed of the crankshaft, defining an expected engine speed based on the acceleration input, calculating a speed error as the rotational speed of the crankshaft less the expected engine speed, calculating engine acceleration and adjusting the predetermined amount of fuel delivered to be combusted in each of the plurality of cylinders to reduce the speed error when the speed error is a function of the instantaneous engine speed. The preferred embodiment is implemented using fuzzy logic.

14 Claims, 4 Drawing Sheets

SPEED ERROR / ACCELERATION

| | | | |
|---|---|---|---|
| .85 | .85 | .85 | .85 |
| .87 | .88 | .90 | .93 |
| .89 | .91 | .94 | .97 |
| 1.0 | 1.0 | 1.0 | 1.0 |

SPEED ERROR / ACCELERATION

| | | | |
|---|---|---|---|
| 25 | 25 | 25 | 25 |
| 20 | 17 | 13 | 10 |
| 15 | 12 | 8 | 5 |
| 0 | 0 | 0 | 0 |

METHOD FOR IMPROVING SPARK IGNITED INTERNAL COMBUSTION ENGINE ACCELERATION AND IDLING IN THE PRESENCE OF POOR DRIVEABILITY FUELS

BACKGROUND OF THE INVENTION

1. Field of the Invention

The present invention relates generally to methods of accelerating and idling an internal combustion engine for an automotive vehicle. More particularly, the present invention relates to a method for accelerating and idling an internal combustion engine utilizing a dynamic fuel source.

2. Description of the Related Art

A problem with internal combustion engines arises when idling or a demand for acceleration is created by the operator of the motor vehicle and a fuel is used having a higher than normal distillation point. The fuel injection system will deliver fuel to the intake ports and the cylinders of the internal combustion engine a fixed volume of fuel. A fixed volume of fuel is delivered to each of the intake ports of the cylinders of the internal combustion engine. If the fuel is characterized by a higher than normal distillation point, the fixed volume of fuel may not be enough to generate the desired idle stability and acceleration due to undesired enleanment. Enleanment creates a feel that the motor vehicle is underpowered. Therefore, attempts have been made to compensate for the composition of the fuel supply to be combusted by the internal combustion engine.

One such attempt is disclosed in U.S. Pat. No. 5,229,946 which discloses a method for optimizing engine performance for internal combustion engines. This method accounts for different blends of fuel; namely, pure fuels and different blends of fuel and alcohol. This method utilizes specific engine parameters to determine what type of fuel is being combusted. This method utilizes a different engine map for each blend of fuel. This approach is not flexible in that it requires a specific blend of fuel before it can look up a value in a specific map. This method also relies on sensing the amount of fuel in a fuel tank to determine whether a sensing event should even occur.

The method disclosed in U.S. Pat. No. 5,229,946 fails to immediately determine the composition of the fuel to better enable the internal combustion engine to operate during demanded acceleration situations. In fact, this disclosed method does not identify the fuel composition until the fuel tank is refilled. Further, there is no provision to measure the performance of the internal combustion engine. The method merely estimates the performance based on the last identification of fuel composition.

SUMMARY OF THE INVENTION

Accordingly, a method for maintaining a rotational speed of a crankshaft of an internal combustion engine is disclosed. The internal combustion engine includes a plurality of cylinders, each having a spark plug. A predetermined amount of fuel is delivered to be combusted in each of the plurality of cylinders with each rotation of the camshaft or crankshaft based on an acceleration demand made by an operator. The method includes the step of receiving the acceleration demand. The method also includes the step of measuring the rotational speed of the crankshaft. The method further includes the step of defining an expected engine speed. The method also includes the step of calculating a speed error as the rotational speed of the crankshaft less the expected the engine speed. The method also includes the step of calculating the acceleration input. The method also includes the step of adjusting the predetermined amount of fuel delivered to be combusted in each of the plurality of cylinders to reduce the speed error as the speed error changes as a function of engine acceleration.

One advantage associated with the present invention is the ability to smoothly accelerate the internal combustion engine regardless of the fuel composition. Another advantage is the ability to reduce the speed error as soon as it is determined that the rotational speed of the crankshaft is not at a value that it should be. Yet another advantage associated with the present invention is the correction of the speed error independently of any parameter of the engine condition other than the rotational speed of the crankshaft, its rate of change, and the acceleration demanded by the operator. Still another advantage associated with the present invention is the ability to reduce the speed error to zero in a manner which does not require additional hardware, thus reducing the cost.

BRIEF DESCRIPTION OF THE DRAWINGS

The above advantages of the invention will be more clearly understood by reading an example of an embodiment in which the invention is used to advantage with reference to the attached drawings wherein.

DESCRIPTION OF AN EMBODIMENT

Figure 1:
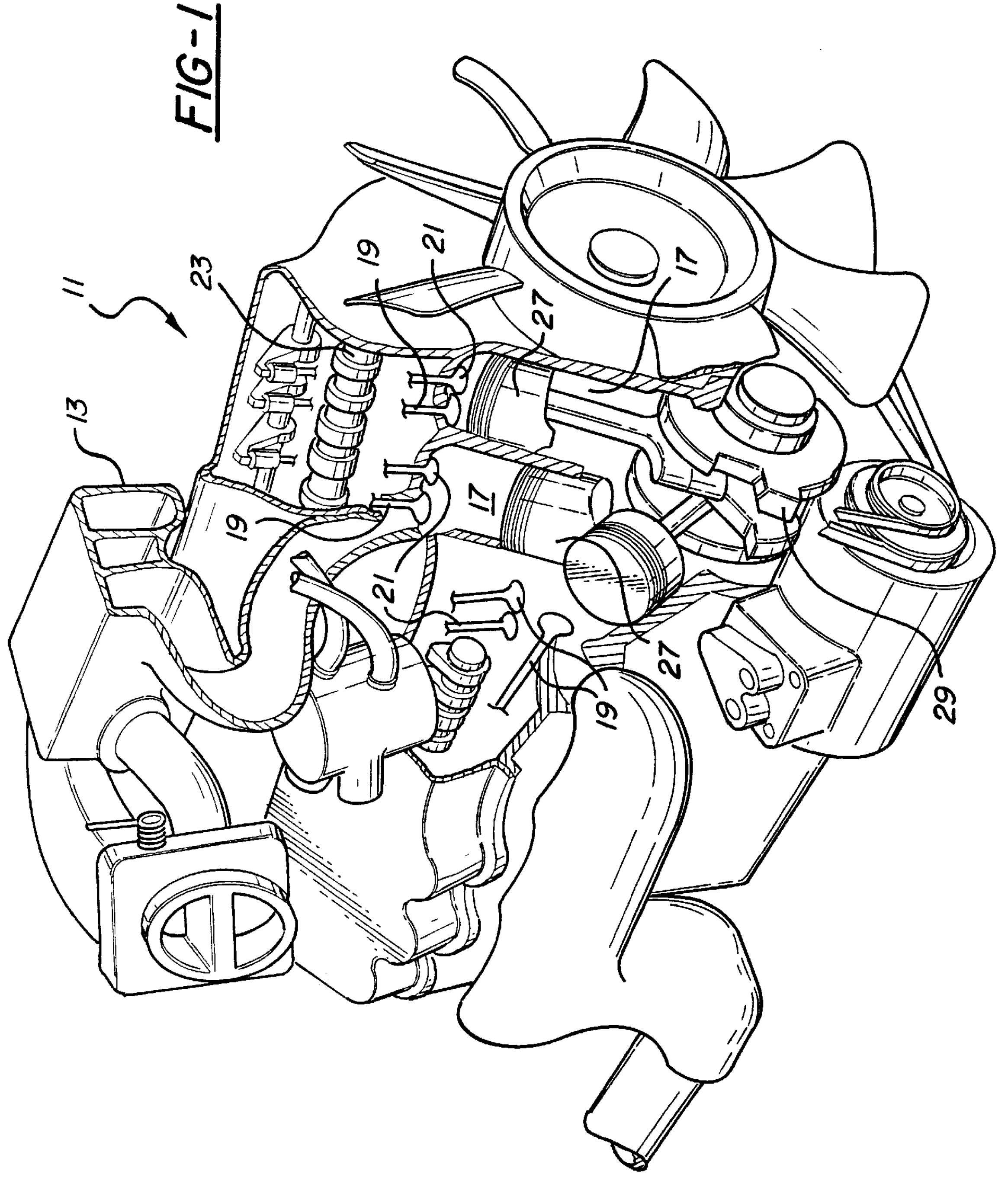
FIG. 1 is a perspective view partially cut away of an internal combustion engine.

Referring to FIG. 1, an internal combustion engine is generally indicated at 11. Although the internal combustion engine 11 is depicted and discussed as being a part of a motor vehicle (not shown), it should be appreciated by those skilled in the art that the internal combustion engine 11 may be used in any environment requiring the power generated thereby. The internal combustion engine 11 receives air through an air inlet port 13. A fuel injector (not shown) injects fuel for a plurality of cylinders, a fuel air mixture is drawn into each cylinder 17 through a plurality of inlet valves 19. The valves, inlet 19 and outlet 21, are moved between an open position and a closed position during different portions of a four stroke cycle. The opening and closing thereof is timed by a camshaft 23 which is rotated through a timing mechanism. When the air/fuel mixture is ignited by a spark plug (not shown), one associated with each of the cylinders 17, a piston 27 within each of the cylinders 17 is forced to move downwardly. This downward action rotates a crankshaft 29 which, in turn, transfers the power generated by the combustion of the air/fuel mixture into a mechanical rotating force to be controlled and used.

Figure 2:
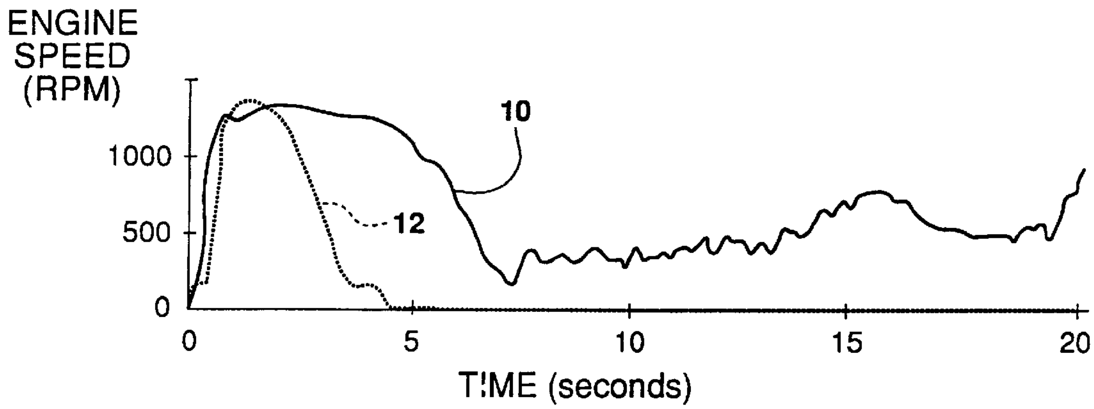
FIG. 2 is graphic representation of engine speed as a function of time.

Referring to FIG. 2, characteristics of an engine speed as a function of time is shown for a type of fuel which is typically referred to as "hesitation fuel" or "fringe fuel." Hesitation or fringe fuels that are defined by a high driveability index based on the distillation characteristics of the fuel or are of a low grade or poor quality. The internal combustion engines must be capable of operating smoothly while combusting these low grade fuels. A first line 10 represents the engine speed as a function of time wherein the engine maintains a speed greater than zero. This speed is, however, lower than desired which results from low power output and, in turn, exhibits objectionable vibrations, noise and longer warm up time periods. The second line 12 represents the engine speed of an internal combustion engine using a hypothetical fuel of such composition that the internal combustion engine may stall in a period of less than five seconds. It should be appreciated by those skilled in the art that this is an undesirable situation.

Figure 3:
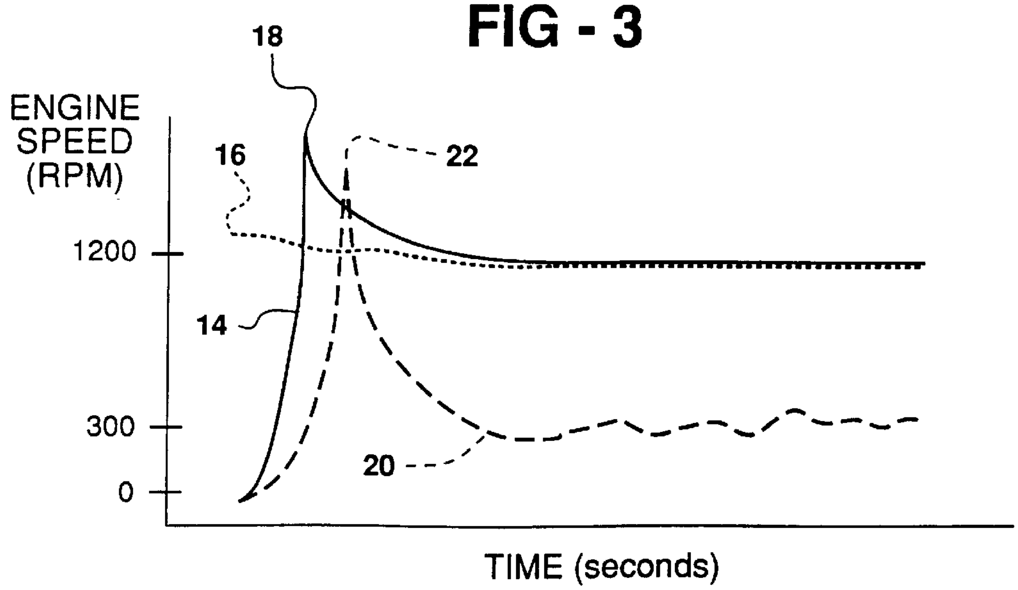
FIG. 3 is a graphic representation of engine speed trajectories as a function of time.

Referring to FIG. 3, an engine speed graph as a function of time is represented. A solid line 14 represents the engine speed of an internal combustion engine using a certification fuel, a fuel used as a standard which may be found in the marketplace having known properties. A dotted line 16 is the idle speed control set point. In one embodiment, the idle speed control set point 16 is substantially constant at approximately 1200 RPM. After the internal combustion engine passes a run-up point 18, the engine speed of the internal combustion engine rapidly approaches the idle speed control set point, as it is designed to do. A dashed line 20 having its own run-up point 22 represents the engine speed of an internal combustion engine using a fringe fuel. After the internal combustion engine reaches its run-up point 22 with the fringe fuel, the engine speed of the internal combustion engine rapidly approaches a 300 RPM level. This level is too low as it results in an insufficient and irregular level of power output.

Figures 4, 5, 6:
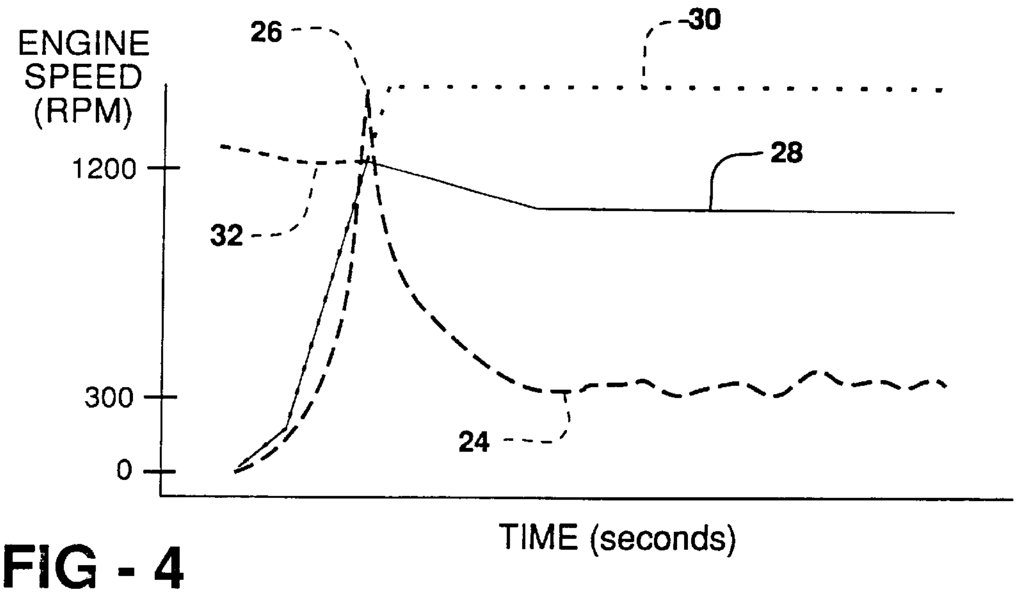
FIG. 4 is a graphic representation of engine speed signature analysis as a function of time.
FIG. 5 is a fuzzy input matrix for fuel control magnitude.
FIG. 6 is a fuzzy input matrix for spark offset control.

Referring to FIG. 4, a fringe fuel detection is graphically represented. The fringe fuel is combusted to create an engine speed along a dashed line 24 with a run-up point 26. An expected speed value 28 is graphically represented by the solid line. The expected speed 28 is defined as the minimum of either a run-up speed, graphically represented as a heavy dotted line 30, or the idle speed control set point 32. As time increases, and because the run-up speed trajectory 30 is greater than the idle speed control set point 32, the expected speed 28 becomes the idle speed set point 32. The difference between the actual speed 24 and the expected speed 28 is calculated to be a speed error. More specifically, the speed error is the difference between the minimum desired speed and the actual speed.

Figure 7:
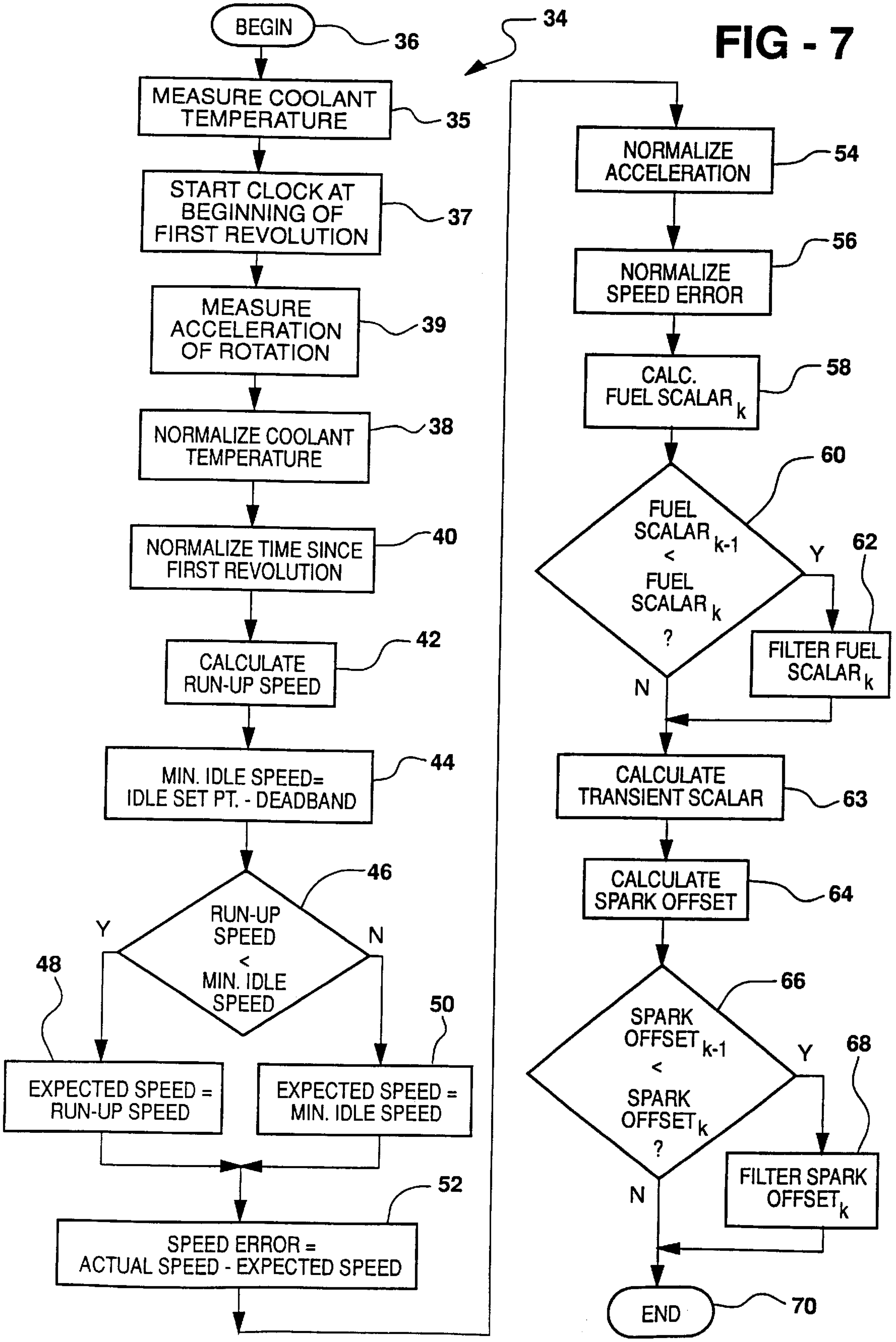
FIG. 7 is a flow chart of one embodiment of the method according to the present invention.

Referring to FIG. 7, the method for accelerating the rotational speed of the crankshaft 29 of the internal combustion engine 11 during a period of acceleration is generally shown at 34. The method begins at 36. The temperature for the coolant used to cool the internal combustion engine 11 is measured at 35. A clock is initiated at 37 as soon as the crankshaft 29 begins to rotate. Any acceleration thereof is measured at 39. The sensed coolant temperature of the internal combustion engine is normalized at 38. The time from when the internal combustion engine begins a first revolution of cranking is normalized at 40. It may be appreciated by those skilled in the art that these parameters may be replaced or augmented with other engine parameters. Once the normalized values are calculated, they are used in a look-up table to produce a calibrated minimum run-up speed as a function of time, at 42. A minimum idle speed value is calculated as the idle speed set point minus a calibrated dead band, at 44. The run-up and the minimum idle speed are compared at 46. If the run-up speed is less than the minimum idle speed, an expected engine speed is defined as the run-up speed at 48. If, however, the run-up speed is greater than or equal to the minimum idle speed, the expected engine speed becomes the minimum idle speed at 50. In other words, the expected engine speed of the method 34 becomes the minimum of the either the run-up or the minimum idle speed. The speed error is calculated at 52 as being the actual rotational speed of the crankshaft minus the expected engine speed, whether it be the minimum idle speed or the run-up speed. Engine acceleration is calculated as the rate of change of engine speed at 39 and is normalized at 54. The speed error is also normalized at 56.

A fuel scalar is calculated at 58 using the fuzzy input matrix shown in FIG. 5. The fuel scalar is used to adjust the predetermined amount of fuel which is delivered to be combusted in each of the cylinders to reduce the speed error as it changes as a function of the engine acceleration. In one embodiment, the fuel scalar is calculated by the normalized acceleration input and normalized speed error. These two values are used in a look-up table, one shown in FIG. 5, to determine what the fuel scalar at time k should be. As the fuel scalar decreases, the amount of fuel delivered to the internal combustion engine is increased. The previous frame time or the "old" value of the fuel scalar is preserved as the fuel scalar at time k−1. FIG. 5 shows that a value of 1.0 produces no change in the amount of fuel delivered to the internal combustion engine because the speed error has a value of zero.

The fuel scalar at time k is compared to the fuel scalar at time k−1 at 60. If the fuel $\text{scalar}_k$ is greater than the previous fuel $\text{scalar}_{k-1}$, the fuel scalar at time k is assigned a value corresponding to its value at time k−1 with a first order exponential decay approximated by a rolling average filter at 62. If not, the fuel scalar at time k is unfiltered. The modulation of in the filtering is provided to insure that fast fuel scalar changes in the presence of a speed error and slowly diminishing fuel scalar changes once the speed error is corrected. It has been determined that it is desirable to modulate the fuel scalar rapidly to rapidly correct a speed error but not to rapidly remove corrections when the speed error does not exist. Therefore, when the speed error is being corrected, i.e., being reduced to zero, the fuel scalar is modulated to gradually increases to 1.0 in this embodiment.

Once the fuel scalar at time k is determined, a tip-in transient fuel compensation scalar is calculated at 63 as a function of the fuel scalar at time k. The tip-in transient fuel compensation scalar is used to determine how much additional delivered fuel is needed to be combusted in order to maintain the acceleration as commanded by the acceleration input, i.e., the tip-in acceleration demand. The additional fuel delivered and combusted prevents acceleration enleanment. A spark offset is added to a firing timing of each of the spark plugs to aid in the reduction of the speed error. The spark offset is calculated as a function of the expected speed and the speed error via the look-up table at 64. The spark offset fuzzy input matrix is shown in FIG. 6. As may be seen from viewing FIG. 6, the offset, an addition to the firing time in which the spark is to occur, is zero when there is no speed error. More specifically, there is no need to offset the desired spark timing when the speed error is non-existent.

The spark offset at time k is compared with the previous spark offset at time k−1 at 66. If the spark offset at time k is less than the previous spark offset at time k−1, the spark offset at time k is assigned a value corresponding to its value at time k−1 with a first order exponential decay approximated by a rolling average filter similar to the fuel scalar filter, at 68. If not, the spark offset at time k is not filtered. The modulation of the filtering is provided to insure that no adjustments occur once the speed error is reduced to zero.

The method is ended at 70. Once the method 34 has been completed, the method returns the control of the combustion of the fuel to the fuel and spark managing system (not shown) until the method is again invoked during the next controller background or frame time interval.

This concludes a description of an example of operation which the invention claimed herein is used to advantage. Those skilled in the art will bring to mind many modifications and alterations to the example presented herein without departing from the spirit and scope of the invention. Accordingly, it is intended that the invention be limited only by the following claims.

What is claimed:

1. A method for accelerating rotational speed of a crankshaft of an internal combustion engine having a plurality of cylinders each having a spark plug wherein a predetermined amount of fuel is delivered to be combusted at a firing time within each of the plurality of cylinders with each rotation of the crankshaft based on an acceleration demand made by an operator, the method comprising the steps of:

receiving the acceleration demand;

measuring the rotational speed of the crankshaft;

defining an expected engine speed based on the acceleration demand;

calculating a speed error as the rotational speed of the crankshaft less the expected engine speed;

calculating engine acceleration from the rotational speed; and adjusting the predetermined amount of delivered fuel to be combusted in each of the plurality of cylinders to reduce the speed error as the speed error changes as a function of the engine acceleration.

2. A method as set forth in claim 1 including the step of adjusting the firing time of each of the spark plugs to reduce the speed error.

3. A method as set forth in claim 1 including the step of producing a run-up speed based on parameters of the internal combustion engine.

4. A method as set forth in claim 3 including the step of establishing an idle speed set point.

5. A method as set forth in claim 4 including the step of defining a minimum idle speed as the idle speed set point less a calibrated deadband value.

6. A method as set forth in claim 5 including the step of defining the expected engine speed as the lesser of the minimum idle speed and the run-up speed.

7. A method as set forth in claim 6 including the step of modulating the step of adjusting based on when the speed error changes.

8. A method as set forth in claim 7 wherein the step of modulating the adjusting occurs rapidly when the speed error is increasing.

9. A method as set forth in claim 8 wherein the step of modulating the adjusting occurs gradually when the speed error is decreasing.

10. A method as set forth in claim 2 including the step of modulating the step of adjusting based on when the speed error changes.

11. A method as set forth in claim 10 wherein the step of modulating the step of adjusting rapidly when the speed error is increasing.

12. A method as set forth in claim 10 wherein the step of modulating the step of adjusting gradually when the speed error is decreasing.

13. A method for accelerating rotational speed of a crankshaft of an internal combustion engine having a plurality of cylinders each having a spark plug wherein a predetermined amount fuel delivered is to be combusted at a firing time within each of the plurality of cylinders with each rotation of the crankshaft based on an acceleration demand made by an operator, the method comprising the steps of:

receiving the acceleration demand;

measuring the rotational speed of the crankshaft;

defining an expected engine speed based on the acceleration demand;

calculating a speed error as the rotational speed of the crankshaft less the expected engine speed;

calculating engine acceleration from the rotational speed;

changing the predetermined amount of fuel delivered to be combusted in each of the plurality of cylinders to reduce the speed error as the speed error changes as a function of the engine acceleration; and offsetting the firing time of each of the spark plugs to reduce the speed error.

14. A method for accelerating rotational speed of a crankshaft of an internal combustion engine a plurality of cylinders each having a spark plug wherein a predetermined amount of fuel delivered is to be combusted at a firing time within each of the plurality of cylinders with each rotation of the crankshaft based on an acceleration demand made by an operator, the method comprising the steps of:

receiving the acceleration demand;

measuring the rotational speed of the crankshaft;

defining an expected engine speed based on the acceleration demand;

calculating a speed error as the rotational speed of the crankshaft less the expected engine speed;

calculating engine acceleration from the rotational speed;

changing the predetermined amount of fuel delivered to be combusted in each of the plurality of cylinders to reduce the speed error as the speed error changes as a function of the engine acceleration; and offsetting the firing time of each of the spark plugs to reduce the speed error;

calculating a transient fuel scalar as a function of the acceleration demand; and changing the predetermined amount of fuel delivered to be combusted as a function of the transient fuel scalar.

* * * * *